United States Patent [19]
Barton et al.

[11] Patent Number: 5,121,373
[45] Date of Patent: Jun. 9, 1992

[54] TRACK JUMPING METHOD FOR AN OPTICAL DISK READING HEAD

[75] Inventors: Mark A. Barton, Rochester; Daniel L. Nelson; Gerald J. Smart, Jr., both of Penfield, all of N.Y.

[73] Assignee: Eastman Kodak Company, Rochester, N.Y.

[21] Appl. No.: 426,357

[22] Filed: Oct. 25, 1989

[51] Int. Cl.5 .............................................. G11B 21/08
[52] U.S. Cl. ................... 369/44.28; 369/32; 358/907
[58] Field of Search ............... 369/44.28, 44.32, 44.34, 369/32, 54, 50, 58, 111; 358/342, 907; 360/78.04, 78.06, 78.07, 78.09, 78.11, 78.14

[56] References Cited

U.S. PATENT DOCUMENTS

| | | | |
|---|---|---|---|
| 4,764,914 | 8/1988 | Estes et al. | 369/111 |
| 4,899,325 | 2/1990 | Katsuhara et al. | 360/78.06 R |
| 4,939,712 | 7/1990 | Abe et al. | 358/907 R |

*Primary Examiner*—Roy N. Envall, Jr.
*Assistant Examiner*—Hung T. Dang
*Attorney, Agent, or Firm*—William W. Holloway

[57] ABSTRACT

Track jumping in the present system is accomplished by using a two step track jump method which accelerates the tracking actuator toward the desired track at maximum acceleration and then decelerates the tracking actuator at a maximum deceleration so that the desired track is reached in a minimum amount of time without the actuator ringing. A matrix containing the times for each jump pulse from track X to track Y is recorded. The matrix table is updated after each jump to compensate for variance factors. The table is stored in memory which allows the system to become more accurate with each jump. If the actuator falls short of the desired position, the jump pulse next applied is lengthened slightly. If the jump pulse causes the actuator to overshoot, the desired position the jump pulse is shortened for the next jump.

6 Claims, 5 Drawing Sheets

| | JUMP DISTANCE → | | |
|---|---|---|---|
| | TOO SHORT | CORRECT | TOO LONG |
| VELOCITY IN DIRECTION OF JUMP | $T_1 = T_1 + \Delta$<br>$T_2 = T_2 + 2\Delta$ | $T_2 = T_2 + \Delta$ | $T_1 = T_1 - \Delta$ |
| STOPPED | $T_1 = T_1 + \Delta$<br>$T_2 = T_2 + \Delta$ | PERFECT JUMP | $T_1 = T_1 - \Delta$<br>$T_2 = T_2 - \Delta$ |
| VELOCITY OPPOSITE DIRECTION OF JUMP | $T_1 = T_1 + \Delta$ | $T_2 = T_2 - \Delta$ | $T_1 = T_1 - \Delta$<br>$T_2 = T_2 - 2\Delta$ |

FINAL VELOCITY

*FIG. 4*

TRACK JUMPING METHOD FOR AN OPTICAL DISK READING HEAD

TECHNICAL FIELD OF THE INVENTION

The present invention relates to the field of optical servo-systems and more particularly to optical servo-systems of the type that position an optical head's lens over recording tracks on a rotating optical disk by jumping from one desired track to the next.

BACKGROUND OF THE INVENTION

In a typical optical disk recording head, the objective lens is mounted in an electromagnetic actuator. This actuator is capable of translating the lens in two orthogonal directions; one for focusing and one for tracking. The focus direction is generally controlled by a continuous analog servo. Tracking, on the other hand, has a variety of modes available. One of these modes is always a track following mode, wherein the tracking servo-system utilizes some form of optical tracking error detection technique to control the tracking actuator such that the laser spot is held, centered over the track being followed. At times, the need arises to move the laser spot from the current track being followed to another track. If the destination track is close enough, it may be reached by moving only the objective lens (via the tracking actuator) as opposed to moving the entire head (via an access carriage). The operation of moving the objective lens from one track to another, is referred to as a track jump.

The actuator mechanically supports the objective lens with light flexures. These provide the desired freedom of movement in the focus and tracking directions and restrict unwanted twisting motions. A simple spring mass model is generally used to mathematically describe the actuators behavior in servo-system analysis and design. In this model the actuator driving current results in a proportional force on the mass (in addition to the spring force). For most purposes this model is adequate, but it does have some inaccuracies.

The track jump operation is generally performed by deactivating all tracking servo-systems, and sending a jump pulse waveform to the tracking actuator. This is done open loop because there is no feedback available during the jump. The shape of the jump pulse waveform is shown in FIG. 2(A). It consists of two parts, an accelerate pulse (1) which starts the lens moving in the desired direction, and a decelerate pulse (2) which slows the lens to a stop as it approaches the desired position. FIG. 2(B) shows the lens velocity along the tracking axis. FIG. 2(C) shows the lens position as it moves from the start track to the destination track. The exact shape of these curves may be calculated from the differential equation which describes a spring mass system, and the boundary conditions of the starting track location and the destination track location. This calculation is the approach which is generally used to determine the pulse duration times for pulse (1) and pulse (2).

In operation, a tracking actuator does not conform to the spring mass math model precisely, also some actuators behave differently than others. As a result, some track jumps don't end up on the desired track. This adversely affects the systems performance, because subsequent retry track jumps must be made. An object of this invention is to improve the accuracy of track jump pulse time selection and thereby the accuracy of the track jumps.

When a drive is new, all possible track jumps are calculated (by the conventional technique described above) and tabulated, by software, in a matrix as illustrated in FIG. 3. The track numbers are all relative to the center of the tracking actuators travel. Tracks outside the range of the matrix cannot be reached without moving the entire head assembly (the matrix is sized large enough to accommodate the full range of actuator travel). The parameters calculated and stored in the individual cells are the actual track jump pulse times for that particular jump. The matrix illustrated covers the whole range of possible jumps, organized by start track on the horizontal and destination track on the vertical. A subset of this matrix could be used instead; tabulating only the short jumps for instance. Once tabulated, in order to perform a jump, the drive simply looks up the pulse times in the matrix (for the jump it needs to perform) and outputs the track jump waveform.

SUMMARY OF THE INVENTION

An "adapting" or "learning" process is what makes this system more accurate. This works as follows: After each track jump, two track addresses are read. If the track jump did not land on the desired track, these addresses are utilized to make an adjustment to the jump pulse times stored in the matrix. Thus, the next time the same jump is attempted, the adjusted pulse times are used, and the likelihood of success is improved. The two addresses are interpreted as follows: If both addresses are beyond the desired track, then the jump was too long and both pulse times are shortened. If both addresses are short of the desired track, then the jump was too short and both pulse times are lengthened. If the second address is further from the start track than the first, then the lens had velocity in the direction of the jump and the decelerate pulse (2) is lengthened. If the second address is nearer to the start track than the first, then the lens had velocity in the direction opposite that of the jump and the decelerate pulse (2) is shortened. These conditions may also be compounded, such as when both addresses are beyond the target, and the second address is further beyond the target than the first. In these cases, the primary rules are compounded by simple summation. The adjustment rules are tabulated in FIG. 4. The actual amount that the pulse is lengthened or shortened in a single adjustment is very small (less than 1%). The benefit of the technique is that over a large number of jumps the software can independently "narrow in" on a jump waveform which works very consistently for each jump.

From the foregoing, it can be seen that it is a primary object of the present invention to provide an improved track jumping method for an optical servo-mechanism.

It is another object of the present invention to provide a track jumping method that automatically corrects position errors encountered in a present jump for future jumps.

It is yet another object of the present invention to provide a jump correction having small increments of adjustment so that final adjustments are consistent over a large number of jumps.

These and other objects of the present invention will become more apparent when taken in conjunction with the following description and drawings wherein like characters indicate like parts and which drawings form a part of the present specification.

BRIEF DESCRIPTION OF THE DRAWINGS

FIG. 4 is a table illustrating a track jumping adjustment table.

DESCRIPTION OF THE PREFERRED EMBODIMENT OF THE INVENTION

Figure 1:
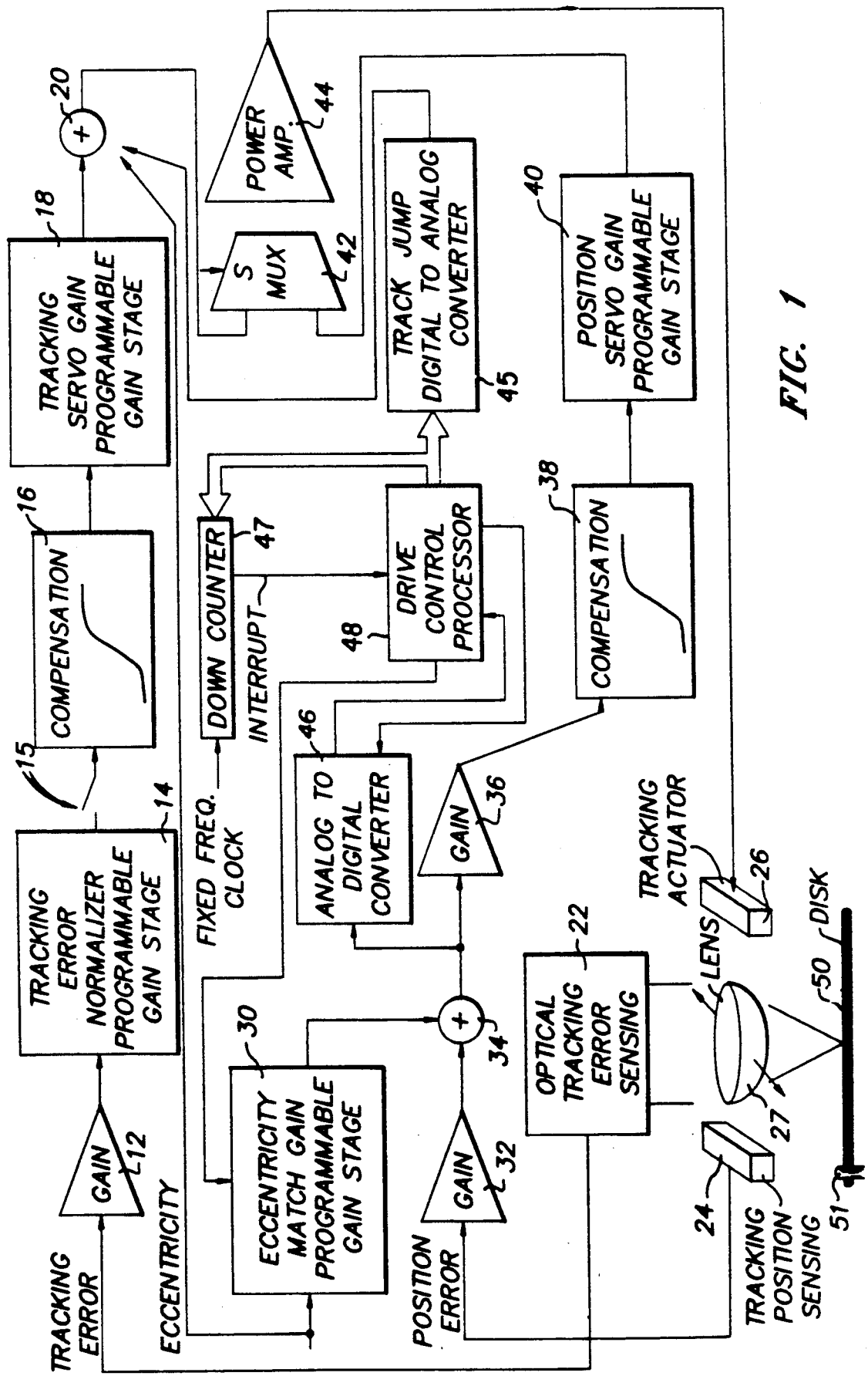
FIG. 1 is a block schematic diagram illustrating an apparatus on which the present invention may be implemented.
Figure 2:
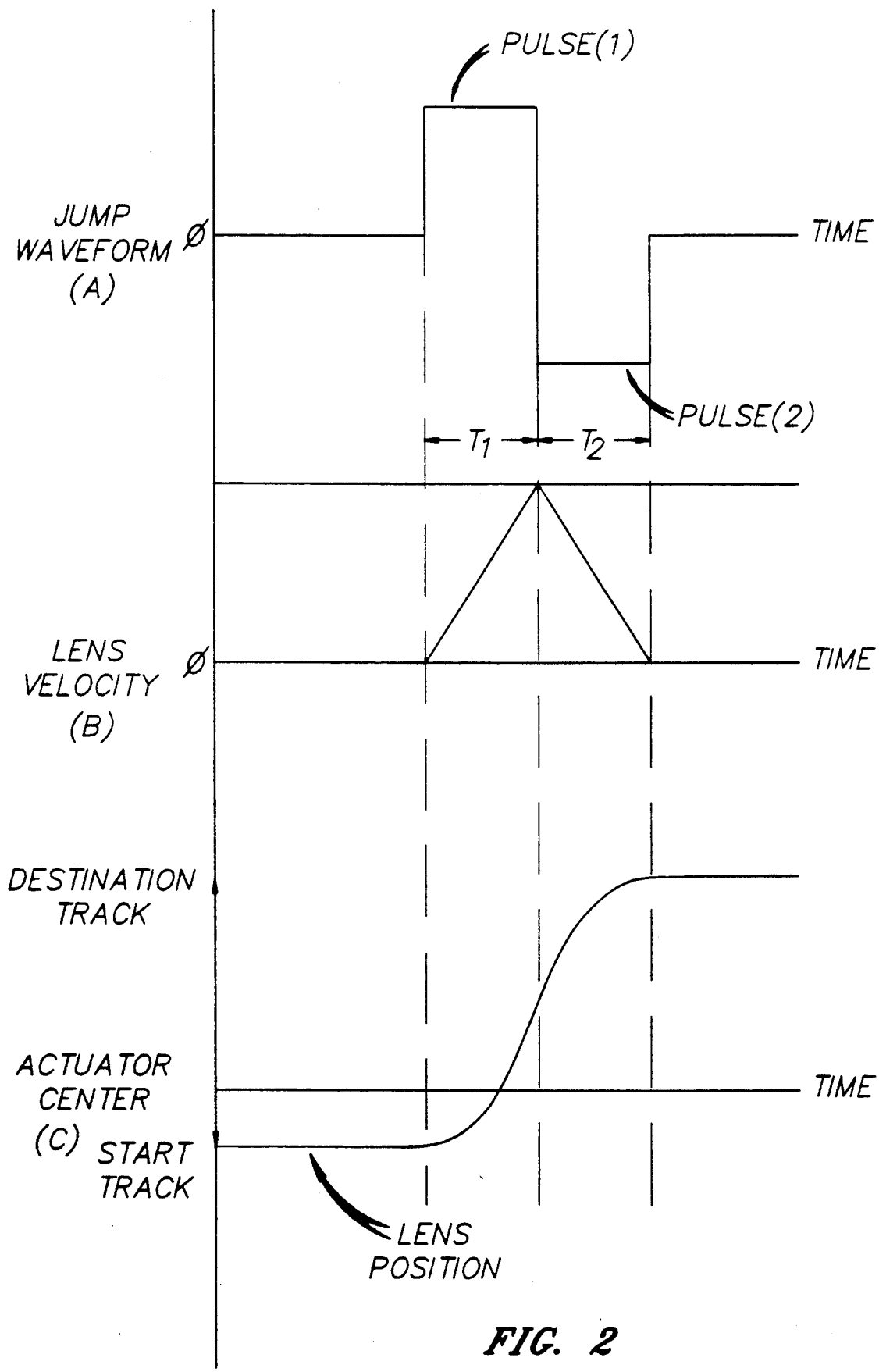
FIG. 2 (A), (B), and (C) illustrate waveforms useful in understanding the operation of the invention.

FIG. 1 illustrates the preferred apparatus upon which the present invention is implemented. A gain amplifier 12 receives the tracking error signal and amplifies the signal for use by a tracking error normalizer circuit 14. The output from the normalizer circuit 14 can be sampled or taken out of the loop by means of a switch 15. A compensation circuit 16 is connectible to the output of the normalizer circuit 14 by means of the switch 15. Once compensated, the signal is directed to a tracking servo gain circuit 18, which provides at its output a signal that is a function of the tracking error compensated. This signal is directed to a summing node 20 and from the summing node to an input to a multiplexer 42. An additional input to the summing node is an eccentricity sine wave signal. A sub-assembly of the type disclosed in U.S. Pat. No. 4,764,914 entitled, "Least Squares Method and Apparatus for Determining Track Eccentricity of a Disk" by M. Estes may be used to generate the eccentricity correction sine wave used by this system. An additional input to the multiplexer 42 is provided through a second servo path, which receives on its input, a position error signal that is amplified by a gain amplifier 32 and is forwarded to a summing node 34. The eccentricity signal, aside from being inputted to the summing node 20, appears at the input to an eccentricity match gain circuit 30 which outputs an amplified signal to the summing node 34 to be summed with the position error signal amplified from the gain circuit 32. This summed signal is a residual position error signal that is directed to a gain amplifier 36 and to the input of an analog-to-digital converter 46. The amplified signal from gain amplifier 36 is directed to the input of a compensating circuit 38. The compensated output signal is directed to a position servo gain amplifier 40 and from there to the other input of the multiplexer 42. The output of the multiplexer 42 is amplified by a power amplifier 44 and is directed to the coils of a tracking actuator 26. The tracking actuator 26 positions a lens 27 with respect to a disk 50. The disk 50 is rotated by a drive spindle 51. An optical tracking error sensor 22 provides a signal indicative of the deviation of the lens position over a track on the disk 50. The tracking error signal from the error sensor 22 is directed to the input of the gain amplifier 12. A tracking position sensor 24 provides a position error signal to the gain amplifier 32 which signal is in turn used to drive the tracking actuator 26 to position the lens. The multiplexer output is determined by the state of a servo select signal S.

The micro-processor 48 which incorporates a matrix table of T1 and T2 time values, drives a track jump analog-to-digital converter 45 by providing the pulses (1) and (2). The output analog signal is directed to the summing node 20 and from there to the tracking actuator 26. A down counter 47 receives a load input, a number corresponding to T1, from the micro-processor 48 along with a clock signal of fixed frequency. The down counter 47 counts down from the count received on the load input as a function of the clock signal and upon reaching a zero count, outputs an interrupt pulse to the micro-processor 48. The counter is then loaded with the number T2 and the cycle repeats.

Figure 3:
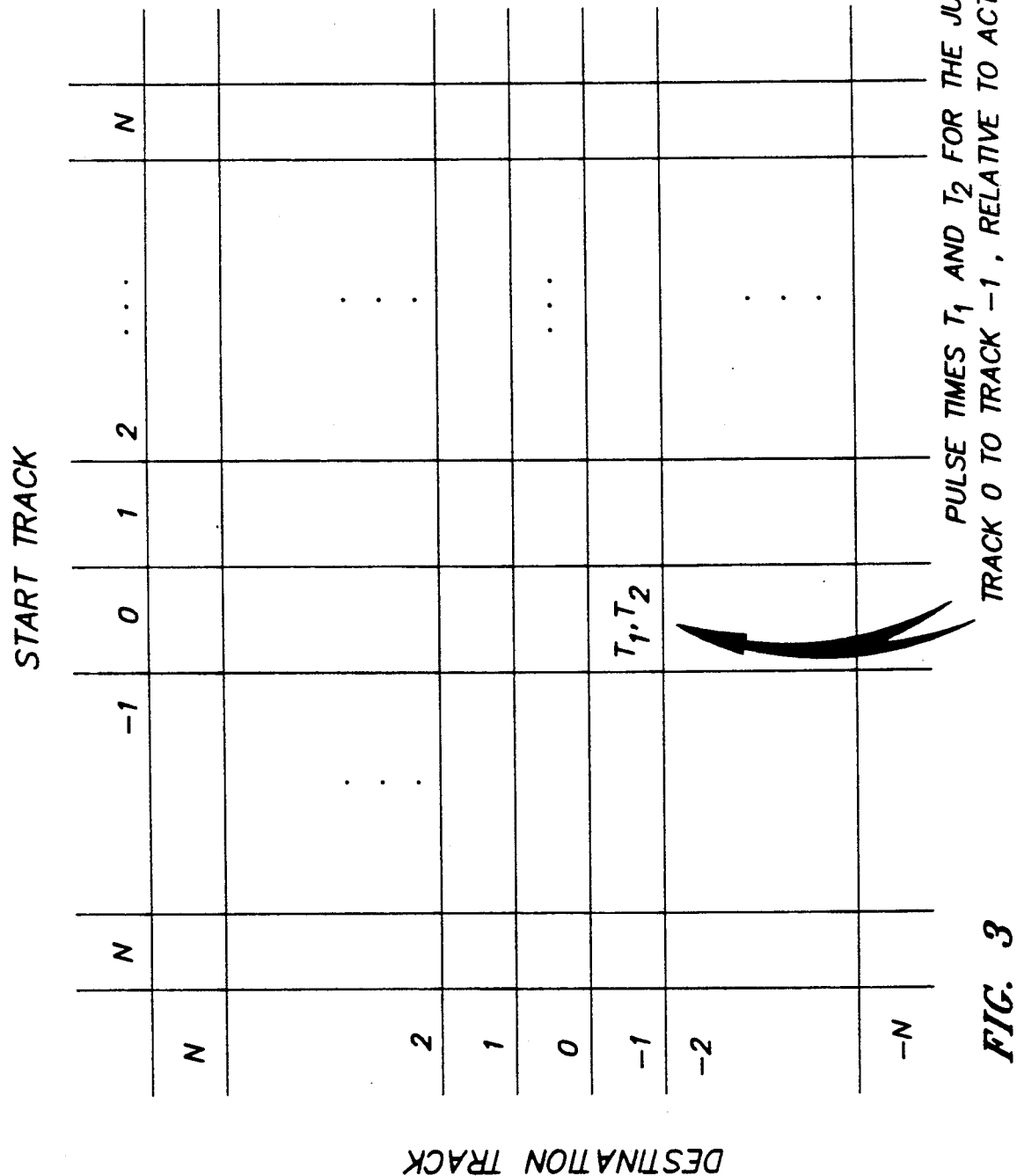
FIG. 3 is a chart illustrating a track jump matrix, which matrix may be incorporated within the microprocessor of FIG. 1.

FIG. 3 illustrates the track jump matrix with the vertical columns being the start track and the horizontal rows representing the destination track. At each cell of the matrix, there is recorded a value for T1 and T2. Initially, the values are generated during a diagnostic auto-calibration mode of operation and are calculated using the actuator characteristics of damping ratio and resonance. From the table, it can be seen that for a jump from the "0" track to the "−1" track the indicated values T1 and T2 are to be used. These values are all relative to the actuators' center.

Referring to FIG. 4, wherein the adjustment rules are tabulated, an "adapting" or "learning" process is what makes this system more accurate. This works as follows: After each track jump, two track addresses are read from the disk. If the track jump did not land on the desired track, these addresses are utilized to make an adjustment to the jump pulse times T1 and T2 stored in the matrix. Then, the next time the same jump is attempted, the adjusted pulse times are used and the likelihood of success is improved. The two addresses are interpreted as follows: If both addresses are beyond the desired track, then the jump was too long and both pulse times are shortened by an amount $\Delta$. If both addresses are short of the desired track, then the jump was too short and both pulse times are lengthened by an amount $\Delta$. If the second address is further from the start track than the first, then the lens had velocity in the direction of the jump, and the decelerate pulse (2) is lengthened. If the second address is nearer to the start track than the first, then the lens had velocity in the direction opposite that of the jump, and the decelerate pulse (2) is shortened. These conditions may also be compounded, such as when both addresses are beyond the target, and the second address is further beyond the target than the first. In these cases, the primary rules are compounded by simple summation. The actual amount that the pulse is lengthened or shortened in a single adjustment is very small (less than 1%). The benefit of the technique is that over a large number of jumps, the software can independently "narrow in" on a jump waveform which works very consistently for each jump.

Figure 5:
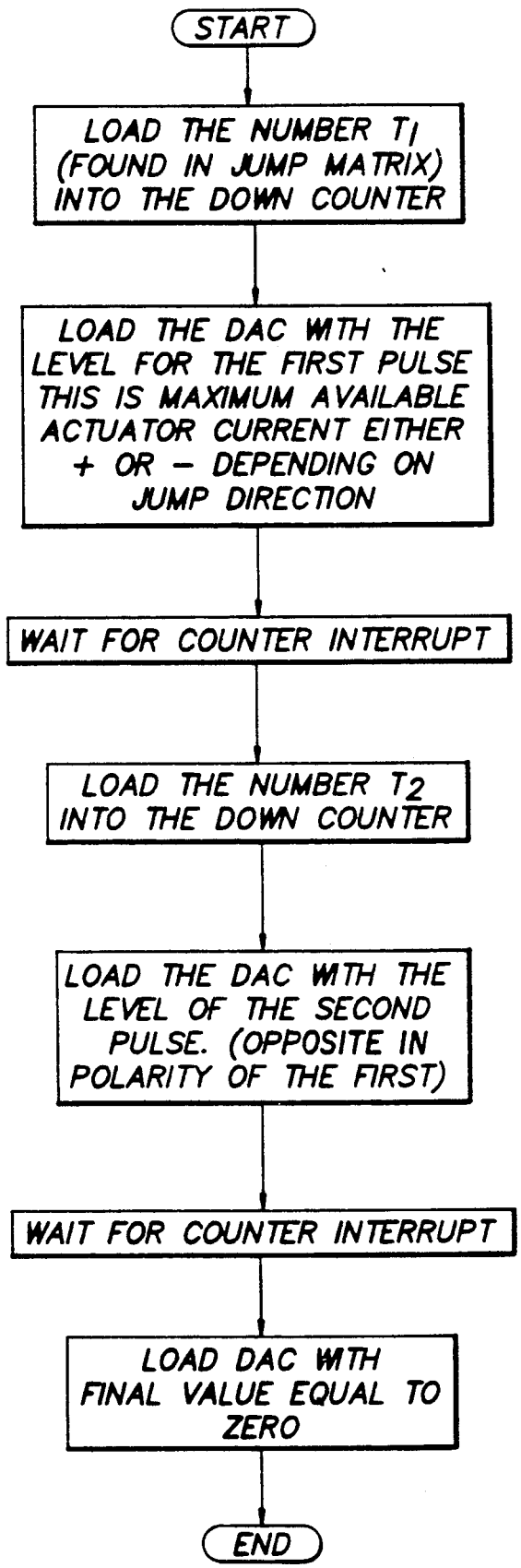
FIG. 5 is a flow chart illustrating a method sequence of the present invention.

FIG. 5 illustrates in flow chart form, the operational steps of the present invention. A track jump is started by loading the number T1, selected from the matrix table within the micro-processor 48 for the desired move, into the down counter 47.

The track jump analog-to-digital converter 45 is loaded with the level of the first pulse. This level causes the maximum level of actuator current either positive or negative, depending on the jump direction to be generated. The counter is down counting at this time from a number corresponding to the time T1. At the termination of the counter, an interrupt signal is generated by the counter and forwarded to the micro-processor 48. The number T2 is then loaded into the down counter 47. The track jump analog-to-digital converter 45 is loaded with the pulse T2 (opposite in polarity to T1). This pulse causes current flow in the actuator to achieve the desired deceleration. The pulse is terminated when the counter generates the interrupt pulse. The track jump analog-to-digital converter 45 is then loaded with a final value equal to 0 to effectively remove any current from the actuator.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A track jumping method for an optical disk reading head, said method comprising the steps of:
    a) calculating and storing in a processing unit a matrix of jump pulse values for all jumps within a window of possible jumps;
    b) by means of the processing unit, selecting a jump pulse value from the matrix corresponding to the intersection of a present track address and a desired track address of the optical head;
    c) activating a tracking actuator to perform a track jump, wherein the activation of the tracking actuator is determined by the selected jump pulse value;
    d) determining the rest track address of the optical disk reading head's lens after the track jump in comparison to the desired track address;
    e) subtracting or adding a correction value to the selected jump pulse value in the matrix stored in the processing unit when the head's lens rest track address is past the desired track address or when the rest track address has not reached the desired track address, respectively; and
    f) returning to step a) when the rest track address is not the desired track address, the rest track address becoming the present track address.

2. The track jumping method of claim 1 wherein determining the rest track address of the optical disk reading head's lens step d) includes the steps of:
    reading two rest track addresses and determining when both rest track addresses are beyond the desired track address, if both rest track addresses are short of the desired track address or when one or the other of the rest track addresses is further from the present track address; and substituting for step e), the step of:
    subtracting a correction value from the jump pulse value when both rest track addresses are past the desired track address, adding a correction value to the jump pulse value when both rest track addresses are short of the desired track address, and adding a correction value to one component of the jump pulse value when the second rest track address is further from the present track address than the first rest track address and subtracting a correction value from the one component when the second rest track address is nearer to the present track address than the second rest track address.

3. The track jumping method of claim 1 further including the step of selecting the correction value to be added to or subtracted from the jump pulse value is small as compared to the value of the jump pulse value.

4. A track jumping method for an optical disk reading head, the method comprising the steps of:
    calculating and storing in a processing unit a matrix of first time values equal to the durations of acceleration pulses and second time values equal to the durations of a deceleration pulses for all track jumps within a window of possible track jumps, said acceleration and deceleration pulses controlling the operation of a tracking actuator for changing position of the optical head;
    selecting a first and second time value from the matrix corresponding to the intersection of a present position and a desired position of the optical head;
    instituting a track jump using the selected first and second time values to control the tracking actuator;
    determining a rest position of the optical disk reading head's lens after the jump in comparison to the desired position; and
    adding or subtracting a correction time value increment to one or both of the selected time values in the matrix when the head's lens position has not reached the desired position or is past the desired position, respectively; and
    returning to the selecting step, the rest position becoming the present position.

5. The track jumping method of claim 4 wherein the step of determining the rest position of the optical disk reading head's lens includes the step of:
    reading two rest track addresses and determining when both addresses are beyond the desired track position, when both addresses are short of the desired track position, or when one or the other of the addresses is further from the present position; and wherein the step of adding and subtracting is replaced by the step of:
    subtracting a correction time value increment from the selected first and second time values when both positions are beyond the desired position, adding a correction time value increment to the selected first and second time values when both positions are short of the desired position, adding a correction time increment to the second time value when the second rest position is further from the present position than the first rest position, and subtracting a correction time value increment from the second time value when the second rest position is closer to the present position than the first rest position.

6. The track jumping method of claim 5 further comprising the step of selecting the correction time value increments are small as compared to the time values with which they are combined.

* * * * *